United States Patent [19]
Bourhis et al.

[11] Patent Number: 5,674,405
[45] Date of Patent: Oct. 7, 1997

[54] METHOD FOR HYDROTHERMAL OXIDATION

[75] Inventors: Alain L. Bourhis, Brookline; Glenn T. Hong, Westborough; William R. Killilea, West Chelmsford, all of Mass.

[73] Assignee: Modar, Inc., Natick, Mass.

[21] Appl. No.: 509,504

[22] Filed: Jul. 8, 1995

[51] Int. Cl.$^6$ .................................................. C02F 1/72
[52] U.S. Cl. .................................................. 210/761; 588/226
[58] Field of Search ........................ 210/761; 588/226

[56] References Cited

U.S. PATENT DOCUMENTS

| | | |
|---|---|---|
| 2,481,089 | 9/1949 | Dickinson . |
| 4,292,953 | 10/1981 | Dickinson ............................ 126/263 |
| 4,338,199 | 7/1982 | Modell ................................. 210/721 |
| 4,377,066 | 3/1983 | Dickinson ............................ 60/39.05 |
| 4,380,960 | 4/1983 | Dickinson ............................ 110/347 |
| 4,543,190 | 9/1985 | Modell ................................. 210/721 |
| 4,594,164 | 6/1986 | Titmas . |
| 4,822,497 | 4/1989 | Hong et al. . |
| 4,898,107 | 2/1990 | Dickinson ............................ 210/759 |
| 5,106,513 | 4/1992 | Hong ................................... 210/759 |
| 5,200,093 | 4/1993 | Barner et al. . |
| 5,232,604 | 8/1993 | Swallow et al. . |

FOREIGN PATENT DOCUMENTS

| | | |
|---|---|---|
| 1537695 | 6/1976 | United Kingdom . |
| WO 96/02471 | 2/1996 | WIPO . |

*Primary Examiner*—Neil McCarthy
*Attorney, Agent, or Firm*—Nydegger & Associates

[57] ABSTRACT

A method of continuous flow hydrothermal oxidation which provides for a low cost means of reaction initiation and propagation. The aqueous-organic feedstock and oxidant are introduced to a small reaction chamber and allowed to mix with the hot, partially reacted contents thereof. This back-mixing serves to initiate the reaction of the incoming feedstock. Optionally, the contents of the chamber then pass to a second reactor located downstream, in order to allow for completion of the oxidation reaction.

4 Claims, 1 Drawing Sheet

METHOD FOR HYDROTHERMAL OXIDATION

BACKGROUND

The process of wet oxidation has been used for the treatment of aqueous streams for over thirty years. It involves the addition of an oxidizing agent, typically air or oxygen, to an aqueous stream at elevated temperatures and pressures, with the resultant "combustion" of oxidizable materials directly within the aqueous phase. The wet oxidation process is characterized by operating pressures of 30 to 250 bar (440 to 3630 psia) and operating temperatures of 150° to 370° C. Since gas phase oxidation is quite slow at these temperatures, reaction is primarily carried out in the liquid phase. Thus, the reactor operating pressure is typically maintained at or above the saturated water vapor pressure, so that at least part of the water is present in liquid form. Even in the liquid phase, however, reaction times are on the order of 1 hour.

Conventional wet oxidation is limited by the degree of oxidation attainable, an inability to adequately handle refractory compounds, slow reaction times, and lack of usefulness for power recovery due to the low temperature of the process. For these reasons, there has been considerable interest in extending wet oxidation to higher temperatures and pressures. In U.S. Pat. No. 2,944,396, issued Jul. 12, 1960 to Barton et al., the addition of a second oxidation stage after a subcritical, wet oxidation reactor is taught. Unoxidized volatile combustibles which accumulate in the vapor phase of the first stage wet oxidation reactor are sent to complete their oxidation in the second stage, which is operated at temperatures both above and below the critical temperature of water of about 374° C. and above and below the critical pressure of water. U.S. Pat. No. 4,292,953, issued Oct. 6, 1981 to Dickinson, discloses a modified wet oxidation process for power generation from coal and other fuels in which, as heat is liberated by combustion, the entire reaction mixture exceeds the critical temperature of water, with operating pressures of about 69 bar (1000 psi) to about 690 bar (10,000 psi) spanning both the sub- and supercritical water pressure ranges. U.S. Pat. No. 4,338,199, issued Jul. 6, 1982 to Modell, discloses a wet oxidation process which has come to be known as supercritical water oxidation (SCWO) because in some implementations oxidation occurs essentially entirely at conditions supercritical in temperature (>374° C.) and pressure (>about 3200 psi or 220 bar). SCWO has been shown to give rapid and complete oxidation of virtually any organic compound in a matter of seconds at 500°–600° C. and 250 bar. Carbon and hydrogen form the conventional combustion products $CO_2$ and $H_2O$. Chlorinated hydrocarbons (CHC's) also give rise to HCl, which will react with available cations to form chloride salts. Alkali may be intentionally added to the reactor to avoid high, corrosive concentrations of hydrochloric acid in the reactor and especially in the cooldown equipment following the reactor. In contrast to normal combustion, which forms $SO_2$, the final product of sulfur oxidation in SCWO is sulfate anion. As in the case of chloride, alkali may be intentionally added to avoid high concentrations of sulfuric acid. Similarly, the product of phosphorus oxidation is phosphate anion.

At typical SCWO reactor conditions densities are in the range of 0.1 g/cc, so that water molecules are considerably farther apart than in normal liquid water. Hydrogen bonding, a short-range phenomenon, has been almost entirely disrupted, and the water molecules lose the ordering responsible for many of liquid water's characteristic properties. In particular, solubility behavior is closer to that of high pressure steam than to liquid water. Smaller polar and nonpolar organic compounds, with relatively high volatility, will exist as vapors at typical SCWO conditions, and hence be completely miscible with supercritical water. Gases such as $N_2$, $O_2$, and $CO_2$ show similar complete miscibility. Larger organic compounds and polymers will hydrolyze to smaller molecules at typical SCWO conditions, resulting in solubilization via chemical reaction. The loss of bulk polarity by the water phase has striking effects on normally water-soluble salts, as well. No longer readily solvated by water molecules, they frequently precipitate out as solids which can deposit on process surfaces and can cause fouling of heat transfer surfaces or blockage of the process flow.

A process related to SCWO known as supercritical temperature water oxidation (STWO) can provide similar oxidation effectiveness for certain feedstocks but at lower pressure. This process has been described in U.S. Pat. No. 5,106,513 issued Apr. 21, 1992 to Hong, and utilizes temperatures in the range of 600° C. and pressures between 25 and 220 bar. For the treatment of some feedstocks, the combination of temperatures in the range of 400° to 500° C. and pressures of up to 1000 bar (15,000 psi) have proven useful to keep certain inorganic materials from precipitating out of solution (Buelow, S., "Reduction of Nitrate Salts under Hydrothermal Conditions", Proceedings of the 12th International Conference on the Properties of Water and Steam, ASME, Orlando, Fla., September, 1994). The various processes for oxidation in an aqueous matrix will hereinafter be referred to collectively as hydrothermal oxidation (HTO) if carried out at temperatures between about 374° and 500° C. and pressures between about 25 and 1000 bar.

A key aspect of the various HTO processes is the means by which the supercritical temperature, which corresponds roughly to the temperature at which rapid reaction commences, is achieved. Table 1 lists relevant prior art in the HTO field, and the means each invention utilizes to achieve reaction temperatures in excess of 374° C.

TABLE 1

Methods used to attain oxidation at supercritical temperature. A semicolon indicates that the patent describes more than one initiation method.

| Author | U.S. Pat. No. | Year | Initiation Method |
|---|---|---|---|
| Dickinson | 4,292,953 | 1981 | Heat of reaction at subcritical conditions |
| Modell | 4,338,199 | 1982 | Recycle of hot reactor effluent using external device |
| Dickinson | 4,377,066 | 1983 | Fluidized bed solids |
| Dickinson | 4,380,960 | 1983 | Recycle of hot reactor effluent using internal venturi |
| Modell | 4,543,190 | 1985 | Injection of supercritical water |
| Burleson | 4,564,458 | 1986 | Heat exchange and subcritical reaction |
| Titmas | 4,594,164 | 1986 | Heat exchange, subcritical reaction and combustion of clean fuel |
| Dickinson | 4,714,032 | 1987 | Recycle of hot solids |
| Kaufmann | 4,774,006 | 1988 | Heat exchange and subcritical reaction |
| Titmas | 4,792,408 | 1988 | Recycle of hot reactor fluid using internal venturi |
| Hong et al. | 4,822,497 | 1989 | Jet induced recirculation in a large vessel |
| Welch et al. | 4,861,497 | 1989 | Heat exchange and subcritical reaction |

TABLE 1-continued

Methods used to attain oxidation at supercritical temperature. A semicolon indicates that the patent describes more than one initiation method.

| Author | U.S. Pat. No. | Year | Initiation Method |
|---|---|---|---|
| Dickinson | 4,898,107 | 1990 | Recycle of hot reactor effluent using internal or external device; Heat exchange; Heat exchange to vaporized feed followed by injection of vaporized feed |
| Hossain et al. | 5,075,017 | 1991 | External heating and subcritical reaction |
| Hong | 5,106,513 | 1992 | Jet induced recirculation in a large vessel; Heat exchange; Recycle of hot reactor effluent using external device |
| Rofer et al. | 5,133,877 | 1992 | External heating |
| Fassbender | 5,167,930 | 1992 | Heat exchange |
| Swallow et al. | 5,232,604 | 1993 | Jet induced recirculation in a large vessel; Heat exchange; Injection of supercritical water |
| Copa et al. | 5,240,619 | 1993 | Heat exchange and subcritical reaction |
| Modell et al. | 5,252,224 | 1993 | External heating and subcritical reaction; Heat exchange and subcritical reaction |
| Gloyna, et al. | 5,358,646 | 1994 | Heat exchange |
| McGinness | 5,384,051 | 1995 | External heating or heat exchange, with injection of supercritical water |

The preceding patents suffer from various disadvantages in attaining rapid reaction rates. These disadvantages are now described, with discussion limited to those patents which introduce unique initiation concepts. Patents which are not discussed rely on initiation methods covered by those which are discussed.

U.S. Pat. No. 4,292,953 of Dickinson relies on heat release from subcritical temperature oxidation, a slow reaction which may require tens of minutes. Although the process fluid density is higher at subcritical temperatures, the slow reaction rate nevertheless results in inefficient use of reactor volume.

U.S. Pat. No. 4,338,199 of Modell shows recycle of reactor effluent to the incoming feed stream to provide rapid heatup and reaction initiation. A disadvantage of this design is that only fully reacted fluid is recycled. It is well known that chemical reactions are frequently propagated by highly reactive intermediate species, so that recycle of incompletely reacted fluid is likely to be beneficial. Furthermore, eductor devices as shown in this patent have limited capacity for control or adjustment, and can tie the flowrate of critical streams to the recycle rate. For example, FIG. 1A of this patent shows a recycle eductor driven by a warm feed stream. The feed stream is essentially incompressible, and makes a poor motive fluid for the low density recycle fluid; the mass ratios shown are very likely impossible to attain. The eductor could potentially be driven by an air stream, but the ability to adjust oxidant level to meet changing feed oxygen requirements would then be severely constrained by the required recycle rate. Use of pure oxygen or highly oxygen-enriched air as a motive fluid, because of the reduced volumetric flow as compared to air, is likely to be impractical.

U.S. Pat. No. 4,377,066 of Dickinson relies on contact with the hot solids of a fluidized bed to achieve rapid heatup and reaction of incoming feedstock. This method may be complicated due to solids handling and fluid distribution, and requires a relatively large reactor to contain the bed of solids.

U.S. Pat. No. 4,380,960 of Dickinson teaches the recycle of fluid from the downstream end of an elongated reactor, i.e., fully reacted fluid, back to the head of the reactor. Thus, as with U.S. Pat. No. 4,338,199 of Modell mentioned above, recycle of reaction intermediates is not brought about. In addition, because the elongated reactor inherently possesses a significant pressure drop, for example tens or perhaps even hundreds of psi, the recycle pump must overcome significant pressure. The examples shown in this patent employ a venturi nozzle, which is unlikely to generate sufficient pressure increase for reactors hundreds of feet in length. Such reactor lengths have commonly been specified and utilized in HTO work. Furthermore, should solid deposits cause constrictions in the reactor pipe, the pressure drop can be greatly exacerbated.

U.S. Pat. No. 4,543,190 of Modell shows the injection of a clean stream of supercritical water as a means of achieving rapid heatup and reaction of incoming feedstock. This method requires a means of continually heating the clean water to supercritical conditions, and increases plant cost by increasing the process volume requirement.

U.S. Pat. No. 4,564,458 of Burleson utilizes a combination of heat exchange and reaction at subcritical conditions to attain rapid, supercritical oxidation. As mentioned above, subcritical reaction is an inefficient method of achieving supercritical temperatures. The use of heat exchange will help speed heatup of the feed, but has the drawback of requiring additional expensive process equipment. The possibility of organic char formation and corrosivity can make the operation of such a heat exchanger very difficult. Use of heat exchange has the further effect of increasing the specific energy of the feedstock, so that feeds must be processed at more dilute levels. This is appropriate for feeds dilute in organic, but a disadvantage for concentrated organic feeds. For example, a cold feed with a heating value of 1800 Btu/lb will reach an adiabatic oxidation temperature of about 600° C. when air is used as the oxidant. If, however, this same feed has been preheated to about 375° C., it may only possess a heating value of 900 Btu/lb to reach 600° C. Thus, the organic content of the preheated feed can only be about half that of the unpreheated feed.

U.S. Pat. No. 4,594,164 of Titmas uses oxidation of clean fuel, in addition to some of the methods described above, to achieve rapid heatup. Processing of clean fuel has the disadvantage of occupying unit capacity in a nonproductive function. Clean fuel represents an additional expense, as does the oxidant which must be correspondingly supplied.

U.S. Pat. No. 4,822,497 of Hong et al. uses jet induced recirculation to recycle heat and reaction intermediates while separating solids, including "sticky" solids such as sodium chloride and sodium sulfate, from the bulk of the process fluid. This scheme for recirculation will be referred to as "immediate back-mixing", as the recirculated fluids are taken from the immediate vicinity of the feed jet, as opposed to some point far downstream. The process is carried out in a back-mixed vessel, which has a low length to diameter ratio as compared to the elongated reactor called for in some of the previously described patents. The back-mixed vessel design allows for process fluid recirculation with a minimal pressure drop, but has a broader residence time distribution than an elongated reactor. Achievement of a given extent of reaction in a back-mixed vessel may therefore require a larger reactor volume than for an elongated reactor. In this patent, the feed stream is injected via a downwardly directed jet, which entrains hot, partially reacted fluid already present in the reactor, initiating rapid reaction. Solids form as the reaction proceeds, and are projected and fall onto a cooler brine zone maintained at the bottom of the reactor. The sticky solids redissolve in the brine and may be continually drawn off from the reactor. (Withdrawal of undissolved sticky solids from a high pressure vessel would be exceedingly difficult.) The solids separation is achieved because only the fraction of the process stream necessary for solids dissolution and transport is withdrawn as brine. The balance of the process stream, which is frequently the largest portion, is caused to reverse flow to an upward direction within the reactor, and is withdrawn from the reactor top section. By this means, it becomes possible to recover a hot, nearly solids free stream from the process. To minimize entrainment of solid particles in the upward flow within the reactor, the velocity is kept to a low value by using a large cross section reactor vessel.

SUMMARY OF THE INVENTION

The present invention describes a continuous hydrothermal oxidation process, with temperatures between about 375° and 750° C. and pressures between about 25 and 1000 bar, which utilizes a small volume back-mixed reaction chamber to achieve at least partial oxidation. The invention is particularly suited to feed streams which do not create substantial amounts of solids which accumulate in the reactor(s). The back-mixed chamber provides for internal recycling of hot, partially reacted process fluid with a low pressure drop, which is less than 100 psi, and preferably less than 10 psi. Various methods may be used to bring about vigorous back mixing, including fluid jets, impingement on solid surfaces, and internal devices such as venturis or impellets. The chamber is designed to be of minimal process volume while providing a sufficient thermal mass to cause rapid reaction initiation of relatively cold incoming feed streams. Once reaction has been initiated, high extents of reaction may be attained within the back-mixed chamber, or optionally by a second stage reactor.

DESCRIPTION OF THE PREFERRED EMBODIMENT OF THIS INVENTION

Figure 1:
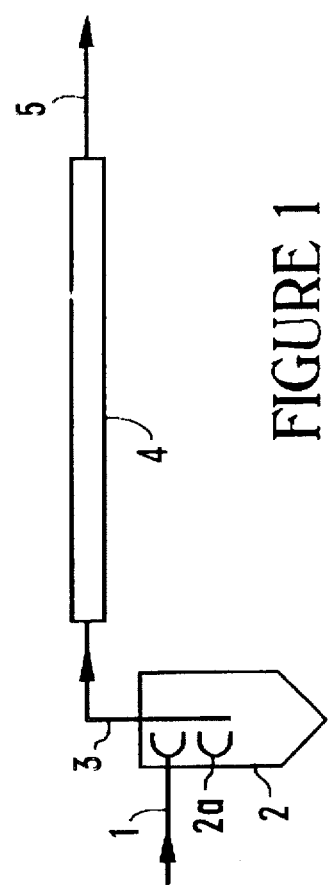
FIG. 1 is a schematic of a two-stage reactor useful for carrying out the process of this invention.

FIG. 1 shows a continuous flow two-stage reactor design which can be used for carrying out the process of this invention. Pressurized feed material mixed with oxidant, which mixture may be cold or preheated to some intermediate temperature, is injected tangentially into back-mixed reaction chamber 2 through pipe 1. The incoming feed mixes with the hot, partially reacted fluid in the chamber and begins to oxidize, liberating sufficient heat to propagate the process as new feed continues to enter the chamber. The optimal chamber temperature depends on the particular feed material, but may for example be in the range of 375°–750° C. The partially reacted process stream exits the chamber through pipe 3 and proceeds to the second stage, plug flow reactor 4, where reaction is brought to the desired level of completion, for example 99.99% destruction of the feed organic carbon. The second stage reactor will frequently operate in the range of 550°–650° C., and may attain 750° C. The reacted process stream proceeds to cooldown and depressurization through pipe 5.

The "back mixing" chamber 2 of FIG. 1 may have many designs. For example, the feed and oxidant may have separate injection points, and be introduced coannularly or as opposing jets. Mixing may be stimulated by using a swirling nozzle, a spray nozzle or internal baffles, jet entrainment identified as 2a in FIG. 1, static or fluidized solids, an internal venturi, or directing the incoming flows at chamber walls. The position of the exit port may be altered as well. Likewise, reactor 4 of FIG. 1 may be other than a plug flow type. For example, some feeds contain or generate corrosive compounds such as hydrochloric or sulfuric acid, so that system components may require a corrosion resistant lining. A plug flow pipe reactor will have a relatively small inside diameter, and may be hundreds of feet in length. Installing a corrosion resistant liner in such a reactor, which would typically have numerous bends and connecting flanges, can be extremely expensive. For such wastes, a vessel reactor may be favored because of simpler liner design and, due to a much lower surface to volume ratio, considerably less liner material. The low surface to volume ratio of a vessel reactor has the further advantage of reducing heat loss to the environment. This feature can be of key importance in the second stage reactor, where only a minor fraction of the reaction and heat release occurs. A vessel reactor with internal baffles to guarantee sufficient residence time may prove useful in this regard, as it combines desirable features of both compact (vessel) and elongated (plug flow) reactor designs.

Figure 2:
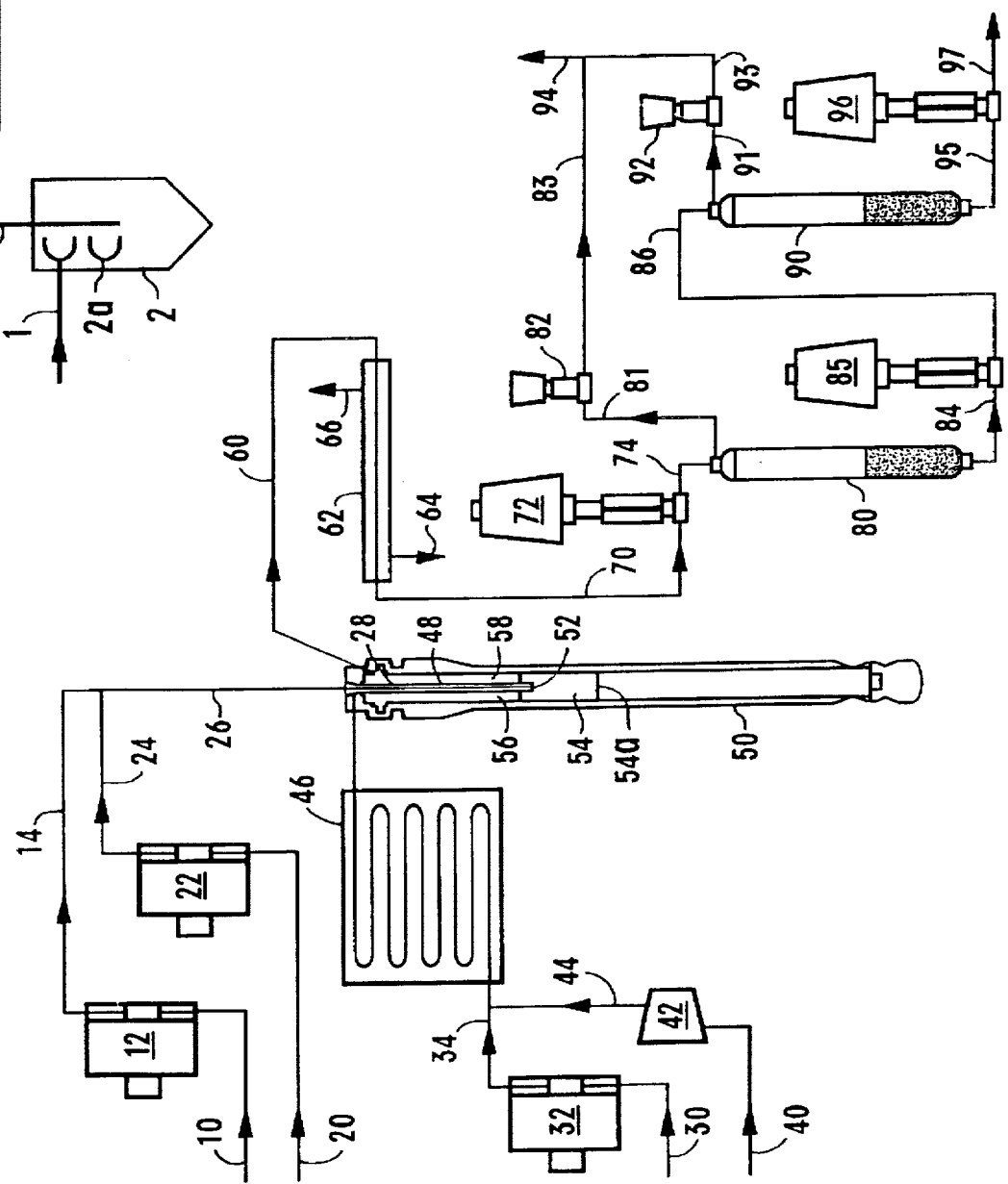
FIG. 2 is an apparatus used to practice this invention.

FIG. 2 shows the HTO apparatus which was used to demonstrate the present invention. The material to be oxidized is typically the feed material, but during system startup would be a clean fuel. It is supplied through line 10 to pump 12, which increases the fluid pressure to the system operating pressure of about 3000 psi. The high pressure fluid leaves the pump through line 14 and proceeds to line 26. Certain feeds, for example pure organic liquids, must typically be diluted with water in order to avoid excessive reactor temperatures. For this purpose, water is supplied through line 20 to pump 22, which increases its pressure to the system operating pressure. The high pressure water leaves the pump through line 24 and proceeds to line 26 to mix with the organic feed. The mixed stream is conducted through insulated tube 28 and injected in an axial direction through nozzle tip 52 into a back-mixed reactor chamber 54. To facilitate usage of preexisting equipment, chamber 54 is located within pressure vessel 50 and is thus pressure-balanced. The portion of the vessel 50 below chamber 54 is essentially isolated by the bottom plate 54a of the cylindrical chamber 54, and thus is unused. In actual commercial practice of this invention, use of a pressure-balanced chamber may prove useful for certain applications. In other cases, however, chamber 54 would itself be the pressure vessel and an outer vessel 50 would not be necessary.

However, in all configurations or arrangements of mixing chambers, the entering fluid and oxygen are subjected to turbulent backmixing. For example, as shown in FIG. 2, the diameter and length of the back mixed reactor chamber 54 is designed such that the entering feed material is impacted off of the walls such as 54a of the reactor and back-flow into the incoming feed and air to provide for turbulent mixing.

For startup purposes, water is supplied through line 30 to pump 32, which increases the fluid pressure to the system operating pressure. Likewise, room air is supplied to compressor 42 through intake duct 40, and exits the compressor at system operating pressure through line 44. The high pressure air mixes with the high pressure water from line 34, and proceeds to electrical heater 46. The heater raises the temperature of the mixed stream to a suitable level, for example about 600° C. The heated stream proceeds to nozzle tip 52 through internally or centrally mounted tube 48, the latter being disposed in an annular fashion around the insulated core tube 28. Within the nozzle tip, the annular fluids mix with the feed from core tube 28 and are then injected into reaction chamber 54. The residence time of the mixed fluids in the nozzle tip is on the order of 0.01 seconds, but this time may vary within the scope of this invention. The use of the hot annular stream of air and water aids in sustaining reaction until the system achieves full operating temperature. Once full operating temperature is achieved, pump 32 is typically shut off and the annulus fluid is comprised of the oxidant alone. Optionally, heater 46 may also be shut off, so that both the feed and oxidant are cold as they enter the reaction chamber 54. Finally, the supply to pump 12 is switched from startup fuel to the actual feed material.

Partially reacted fluid leaves chamber 54 through exit 56 and emanates into the annular head space 58 above the chamber, where temperature rapidly declines to about 300° C. Thus, reaction is quenched soon after the process stream leaves the chamber 54.

The single-phase fluid stream which exits head space 58 via line 60 passes through heat exchanger 62 to be cooled to near ambient temperature by exchange with cooling water. The cold cooling water enters the heat exchanger through line 64, while the warm cooling water leaves the heat exchanger through line 66. By virtue of the cooling, the process effluent which leaves the heat exchanger through line 70 is now comprised of separate gas and liquid phases. It has its pressure dropped from 3000 psi to about 1500 psi through control valve 72. The partially depressurized stream flows through line 74 to the medium pressure separator 80 which segregates the gas and liquid phases. The gas phase is comprised primarily of nitrogen, residual oxygen which was not consumed during the reaction, and some of the carbon dioxide which was produced by the reaction. It leaves the separator near the top through line 81, and has its pressure reduced to near ambient through back pressure regulator 82. The depressurized gas flows through lines 83 and 94, at which point it is vented or sampled for analysis. The liquid leaves the medium pressure separator 80 from the bottom, passing through line 84 to the control valve 85 which drops the pressure to about 100 psi. This pressure reduction leads to the effervescence of most of the remaining carbon dioxide reaction product from the liquid phase. The low pressure gas/liquid stream flows through line 86 to the low pressure separator 90. The gas, primarily $CO_2$, leaves from the top of the separator through line 91, and has its pressure reduced to near ambient through back pressure regulator 92. The depressurized gas flows through lines 93 and 94, at which point it is vented or sampled for analysis. The liquid leaves the low pressure separator 90 from the bottom, passing through line 95 to the control valve 96 which drops the pressure to near ambient. The liquid, typically near-potable quality water, then flows through line 97 to be sampled or disposed of.

The system of FIG. 2 was used in the experiments described in the following examples.

EXAMPLE 1

In this test, the backmix chamber 54 was sized to provide a residence time of about 10 seconds at 600° C. The operating pressure was chosen as 3000 psig. Reaction chamber operation was monitored by 4 thermocouples which were placed either within the chamber or the exit port 56. Table 2 summarizes the feed materials treated, the operating conditions, and the results obtained. Various feed materials were treated in succession. The "Feed" column shows the feed flowrates, which were chosen to give approximately equal rates of heat release for the various feeds. The "Water" column shows the cold water flowrate, chosen to dilute the feeds to give a final reaction temperature of about 600° C. The "Air" column shows the air flow to the reactor, approximately a 30% stoichiometric excess. The "SCW" column shows that supercritical water (SCW, pump 32 in FIG. 2) was turned off for all cases shown. Heater 46 of FIG. 2 was kept on, however, so that annular air temperatures were in the range of 500°–600° C. The "$\tau$,° C." column shows the primary indicator of successful operation—the continued high temperature within the chamber. Had reaction ceased, this temperature would have dropped sharply within seconds rather than remaining steady. For each feed, a steady state operation was maintained for a period of at least about 30 minutes. The "$\tau$,sec" column shows actual residence time $\tau$ calculated at the flowrates and reactor operating temperatures shown in the table. The "CO,ppm" column shows the carbon monoxide (CO) level in parts per million volume as measured in the gaseous effluent (line 94 in FIG. 2). The CO levels compare favorably with those obtained from common combustion processes such as incineration or car engines (hundreds of ppm typically). Many implementations of hydrothermal oxidation can readily attain effluent CO levels of single ppms, however. This could be achieved for the current invention by using a second stage reactor after the backmixed chamber.

The "TOC,ppm" column shows the Total Organic Carbon (TOC) analysis of the liquid effluent (line 97 in FIG. 2). The TOC Analyzer used in these studies utilizes the potassium persulfate oxidation procedure, and has a detection limit of 1 ppm (milligrams per liter). TOC was undetectable for the alcohol feeds, yielding a TOC-based destruction efficiency in excess of 99.99%. For the kerosene data point the TOC value also indicates excellent destruction efficiency, however the system effluent contained a small amount of unreacted char. The TOC analysis was only carried out on the supernatant, after the char had settled out of solution. It is believed that the char formed in the nozzle tip, where hot air contacted droplets of pure kerosene entrained in a cool water stream. While not shown in the table, it was found that addition of about 30 g/min of SCW via the annular flow eliminated the formation of char and gave essentially complete oxidation of kerosene. Long chain alkanes such as kerosene may thus represent an instance where annular flow of SCW is desirable. It is also likely, however, that alternative feed introduction strategies could eliminate char formation in a more economical fashion. This might be done, for example, by the use of cold rather than hot air in the annulus, a nozzle design which does not mix the annular and core flows before they enter the reaction chamber, or one which entrains some of the hot chamber fluid into the annular stream.

Despite the formation of char, the kerosene reaction was robust. At one point during this portion of the run, an erroneous control signal caused an automatic shutdown of the kerosene and cold water flows (pumps 12 and 22 in FIG. 2). Heater 46 was on to provide hot air, but SCW (pump 32) was not being used, and reaction chamber temperatures rapidly declined to just above 500° C. Kerosene and cold water were restarted, and reaction immediately resumed.

TABLE 2

Backmix chamber with nominal 10 seconds residence time.

| | Flowrates, grams/min | | | | T, °C. | τ, sec | CO, ppm | TOC, ppm |
|---|---|---|---|---|---|---|---|---|
| Feed | Feed | Water | Air | SCW | | | | |
| Ethanol | 8.3 | 50 | 94 | 0 | 588 | 9.1 | 54 | <1 |
| Isopropanol | 7.9 | 52 | 94 | 0 | 602 | 8.6 | 38 | <1 |
| Methanol | 15.0 | 51 | 94 | 0 | 599 | 8.9 | 33 | <1 |
| Kerosene | 5.3 | 52 | 94 | 0 | 580 | 9.2 | 7 | <1 |

TABLE 3

Backmix chamber with nominal 3 seconds residence time.

| | Flowrates, grams/min | | | | T, °C. | τ, sec | CO, ppm | TOC, ppm |
|---|---|---|---|---|---|---|---|---|
| Feed | Feed | Water | Air | SCW | | | | |
| Kerosene | 4.9 | 51 | 88 | 82 | 604 | 1.9 | 5 | <1 |
| Ethanol | 7.9 | 50 | 94 | 0 | 614 | 3.0 | 190 | <1 |
| Ethanol | 8.7 | 55 | 94 | 0 | 581 | 3.0 | 220 | <1 |
| Isopropanol | 9.4 | 55 | 94 | 0 | 581 | 3.1 | 220 | 4 |
| Methanol | 12.7 | 50 | 94 | 0 | 576 | 2.7 | 210 | <1 |
| Acetic Acid | 16.8 | 45 | 94 | 0 | 604 | 3.3 | 60 | 44 |

EXAMPLE 2

In this test, the backmix chamber 54 was sized to provide a residence time of about 3 seconds at 600° C. The operating pressure was chosen as 3400 psig. The apparatus and operation were otherwise the same as in the preceding example.

In the first portion of the test, the minimum SCW flow needed to avoid char formation with kerosene feed was investigated. With the annulus fluid (air plus SCW) temperature about 600° C., SCW was ramped down while feeding kerosene and cold water through the core tube 28. Table 3 shows a data point when the SCW flow was still relatively high and kerosene conversion was essentially complete. It was found that char formation began when SCW flow was reduced to somewhere between 10 to 20 g/min.

The alcohols again showed high destruction efficiencies in excess of 99.99%, although in the case of isopropanol there was a detectable level of residual TOC. CO levels were significantly higher than for the 10 second residence time tests, but this data is not used in the destruction efficiency calculation. Acetic acid was also tested in this run, as it is one of the more refractory organics commonly encountered. While reaction was robust and self sustaining for the data point shown in the table, a significant TOC residual limited the destruction efficiency to 99.96%. Reduction of the effluent CO levels or TOC might be effected by a number of methods, including increased residence time or improved mixing in the reaction chamber or a second stage reactor such as 4 in FIG. 1 to obtain 99.99% destruction.

This run also tested the operability of the system with reduced annular air temperatures. For the second ethanol data point in Table 3, and for the isopropanol, methanol, and acetic acid, heater 46 had been shut off and the air temperature entering annulus 48 was below 100° C. The lowest annular temperature reached was 65° C. during the acetic acid portion of the test, as this was the last segment to be run and heater 46 had cooled the most. Given the low heat capacity of air, this data point is believed to sufficiently demonstrate that the system can be operated satisfactorily on ambient temperature oxidant.

Discussion of the Invention

The present invention is similar to U.S. Pat. No. 4,822,497 in that immediate backmixing of hot, partially reacted fluid is used to propagate the oxidation reaction. That patent is directed towards handling feed streams which contain or generate substantial amounts of sticky solids, and seeks to minimize impingement of the process stream on reactor walls or internal parts. As stated within the patent, "any significant constriction" in the path of the fluid flow within the reactor must be avoided. In practicing the patent, it has been found that the residence time for the hot fluid must typically be at least 30 to 60 seconds, with additional reactor volume required for the brine zone. Furthermore, injection of feeds into the reactor at high velocities, for example more than about 15 feet per second, yields high mixing rates within the vessel and the undesirable side effect of high levels of solids accumulation on the reactor walls.

The present invention, by contrast, can accommodate only minor amounts of sticky solids, but since the feeds which are part of this invention do not cause substantial amounts of "sticky" solids (which are, by definition, solids which precipitate and adhere to the wall of the reactor), there is no longer need to minimize process fluid impingement on the reactor wall or other surfaces. Non-sticky feeds are feeds which do not generate substantial amounts of sticky solids during oxidation, or only non-sticky solids, such as oxide solids. Also, feeds which generate a combination of salts and non-sticky solids may be utilized but those particular feeds must be tested. Limiting this invention to non-sticky feeds makes possible the vigorous mixing of newly introduced feed with the existing reactor contents by various means, and utilizes much smaller reactors than the reactors disclosed in U.S. Pat. No. 4,822,497. As shown by the preceding examples, residence times of less than 10 seconds should be sufficient for many types of feed. The required residence time may vary with different feeds or operating temperatures, however. Residence time of up to about 30 seconds is expected to be useful. A particular advantage of the invention is that it does not require the use of a heat exchanger, and thus can treat relatively concentrated feeds.

EXAMPLE 3

Table 4 shows representative reactor sizes useful in practicing the present invention at different scales of operation. The reactor is assumed to operate at 600° C. with a 10 second residence time. The waste being processed has sufficient fuel value to raise its own temperature from ambient to 600° C., i.e., it is autogenic. The oxidant is assumed to be air, and oxidation kinetics are assumed to be unaffected by operating pressure. Reactor sizing is carried out to obtain a sufficient combination of residence time and operating temperature to attain the desired degree of oxidation. For example, operating temperatures below 600° C. may require larger reactor volumes (longer residence times), while use of pure oxygen as the oxidant will allow a reduction in reactor size. Feeds which are subautogenic may be preheated to facilitate usage of the present invention. In this case, the oxidant requirement is lower and the reactor may be smaller in size.

TABLE 4

Representative Reactor Sizes in Gallons
Residence time = 10 seconds, autogenic waste, air oxidant
Operating temperature = 600° C.

| Waste Throughput, | Operating Pressure | | | | |
|---|---|---|---|---|---|
| gpd | 1000 psi | 2000 psi | 3000 psi | 4000 psi | 5000 psi |
| 5,000 | 68 | 34 | 23 | 17 | 14 |
| 20,000 | 270 | 135 | 90 | 68 | 54 |
| 100,000 | 1350 | 675 | 450 | 338 | 270 |

While the illustrative examples of the invention have been described with particularity, it will be understood that various other modifications will be apparent to and can readily be made by those skilled in the art without departing from the scope and spirit of the invention. Accordingly, it is not intended that the scope of the claims appended hereto be limited to the examples and descriptions set forth herein.

For example, this invention may be used in conjunction with U.S. Pat. No. 5,232,604, which teaches chemical methods for facilitating reaction initiation.

What is claimed is:

1. A process for continuous oxidation in a reactor, the process comprising the steps of:

(a) providing a feedstock of oxidizable material to the reactor;

(b) providing an oxidant simultaneously with the feedstock to the reactor; and (c) turbulently mixing the feedstock and oxidant with the contents of the reactor by directly and deliberately impinging the feedstock and oxidant upon at least one solid surface within the reactor, at temperatures between about 375° C. and 750° C. and pressures between about 25 and 1000 bar, to accomplish substantial oxidation of the feedstock within the reactor in a period of less than about ten seconds.

2. The process of claim 1 wherein the step of turbulently mixing is sufficiently vigorous so that the feedstock in the reactor is substantially oxidized in a period of less than about five seconds.

3. The process of claim 1 comprising the step of transferring a fluid stream from the reactor to a second stage reactor to obtain additional oxidation.

4. The process of claim 1, further comprising the step of transferring a fluid stream from the reactor to a second stage reactor for additional oxidation at temperatures above 375° C.

* * * * *